May 12, 1931.  C. G. KELLER  1,804,938
VEHICLE WHEEL
Filed Oct. 21, 1926   2 Sheets-Sheet 1
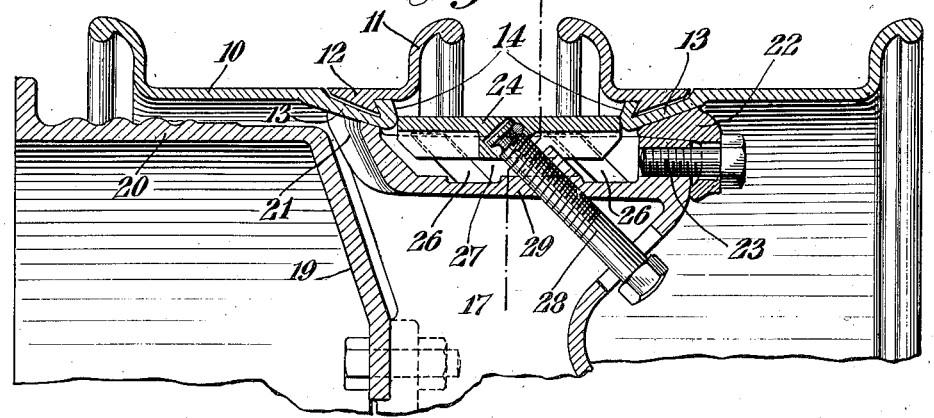
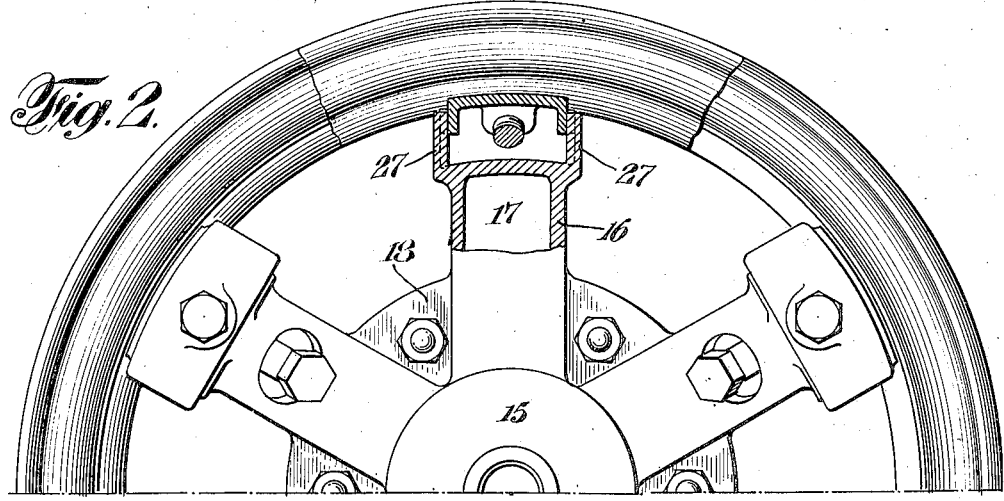
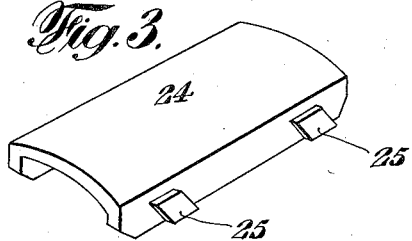
INVENTOR
Charles G. Keller
BY
Dean Fairbank Obreght & Hirsh
ATTORNEYS May 12, 1931. C. G. KELLER 1,804,938
VEHICLE WHEEL
Filed Oct. 21, 1926 2 Sheets-Sheet 2

INVENTOR
Charles G. Keller
BY
ATTORNEYS

Patented May 12, 1931

1,804,938

UNITED STATES PATENT OFFICE

CHARLES G. KELLER, OF POUGHKEEPSIE, NEW YORK

VEHICLE WHEEL

Application filed October 21, 1926. Serial No. 143,051.

This invention relates to vehicle wheels having readily detachable rims, and relates more particularly to the means employed for engaging the rim to hold it in place and to permit of the quick and easy removal and replacement of the rim.

The invention may be utilized in connection with a standard form of rim, for instance, that commonly known as the Goodyear rim, without necessitating any change in the rim, or it may be used with rims especially designed to cooperate with my improved securing means.

Although certain features of my invention are adapted for use with vehicle wheels having fellys, I have particularly in mind a wheel construction in which no felly is used and in which the rim is secured directly to the spoke ends, thus greatly simplifying the construction, reducing the weight and cost, and facilitating rapid dissipation of heat caused by road contact or brake action.

As one important feature I provide a combined clamping and spacing member so designed that it may be moved in a direction having radial and axial components, into or out of position between the two rims of a double tread wheel so as to act as a spacer for the rims, a retainer for one of them, and a stop against which the other rim may be clamped.

Other features of importance will be pointed out hereinafter in connection with a detailed description of one embodiment of my invention, or will be apparent from a consideration of the construction illustrated.

In the accompanying drawings:

Fig. 1 is a longitudinal section in a radial plane through a portion of a wheel constructed in accordance with my invention.

Fig. 2 is an end view, a portion of one spoke being shown in section, and a portion of one rim being broken away.

Fig. 3 is a perspective view of one form of combined spacing and clamping member.

Figure 4:
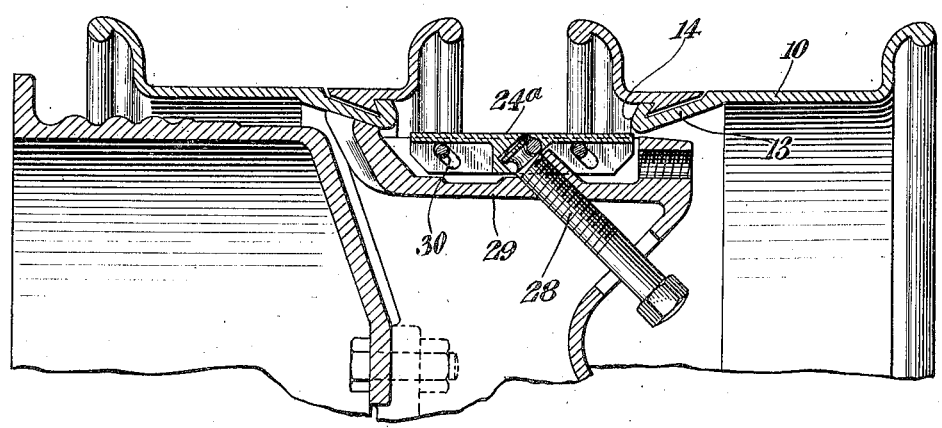
Fig. 4 is a view similar to Fig. 3, but showing the clamping member in inner or released position, and showing a different form of guide for said member.
Figure 5:
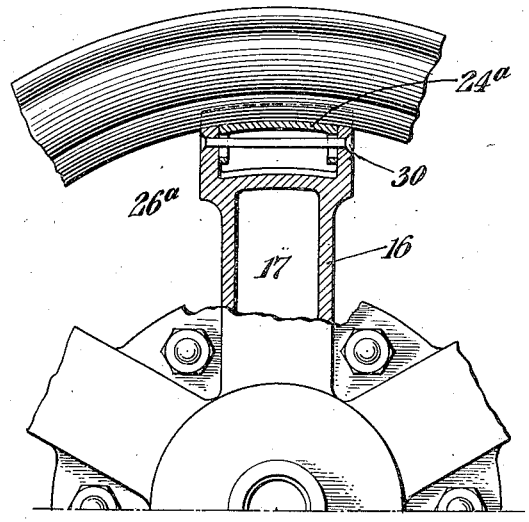
Fig. 5 is an end view, partly in section, of the construction shown in Fig. 4.

The construction illustrated in Figs. 1, 2 and 3 is adapted for carrying two rims with their separate pneumatic or other tires, and also a brake drum. The rims illustrated are of the type commonly known as the Goodyear rim, and include two sections 10 and 11, interlocked against relative axial movement by a flange 12 on one section fitting into a groove or channel in the other. This channel is in the outer surface of a bead which includes two walls 13 and 14, the former presenting an inwardly facing inclined surface, and the latter extending substantially radially and thus presenting an axially facing shoulder. The bead is an annular one, that is, it extends all the way around the rim and thus constitutes a strengthening or reinforcing element for the rim between adjacent spokes if no felly is employed. So far as concerns the clamping means, this bead might be merely a series of spaced projections instead of a continuous projection, and each of a width corresponding to the portion of the rim support which engages therewith.

The rim supporting structure of the wheel is preferably of spider form, that is, it includes a central hub 15 with radially extending spokes 16 which are free at their outer ends, in that they are not connected by any felly. The spokes and hub are preferably cast integral and each spoke is of U form so as to provide a channel 17 lengthwise thereof and which serves for the passage of a current of air induced by the centrifugal action during rotation of the wheel. The spokes are connected adjacent to their inner ends by an inwardly extending flange 19 of a brake drum 20. This drum lies beneath and spaced from the inner rim of the wheel, and the flange forms a side wall for the air passage 17, so that the current of air enters the passage adjacent to the hub and is forced out between the brake drum and one of the rims, so as to aid the air circulation for cooling, and to thus prevent the transmission of heat from the brake drum to the tire. The outer surface of the brake drum may be ribbed, or constructed with heat radiating projections of any suitable character to facilitate the heat transfer.

The outer end of each spoke is provided with a projecting portion 21 presenting an inclined surface adapted to engage with the inclined wall 13 of the inner rim, and carries a clamping member 22 which has a similar but oppositely inclined surface for engaging with the wall 13 of the outer rim. The clamping member 22 is adjustable toward and from the projection 21, and may be locked in place by a cap screw 23 or other suitable means. The hole in the member 22 through which the cap screw extends, is larger than the body portion of the screw, so as to permit the clamping member 22 to accurately seat between the outer surface of the end of the spoke and the inner surface of the wall 13 of the rim.

Between the inclined surfaces of the two parts 21 and 22 I provide a spacing member 24 of a width equal to the desired minimum distance between the shoulders 14 of the projections of the two rims. This member also serves as a clamping member to force the inner rim on to the projection 21 of the spoke, and as a stop against which the outer rim is forced by the clamping member 22. This member 24 is movable in a direction having an axial and a radial component, that is, it is movable in a direction at an acute angle to the axis of the wheel. For guiding the member 24 I have shown its opposite side edges as being provided with inclined flanges 25 which are slidable in corresponding grooves 26 in the side walls 27 of a chamber at the outer end of the spoke, and in which the member 24 is mounted.

There may be, and preferably is, slight lost motion between the guiding flanges 25 and the corresponding grooves 26, and also a lost motion between the end of the screw 28 and the socket into which it extends. For operating the member 24 I provide means which will serve to positively force the member outward radially and toward the inner rim, or inward radially and toward the outer rim. This means is shown as a screw bolt 28 disposed at an angle to the axis of the wheel and substantially parallel to the guiding flanges 25. The bolt has threaded engagement with the inner wall 29 of the chamber in which the member 24 is mounted, and is rotatable in a socket in the member 24, but is held against longitudinal movement in respect to said member. The screw bolt extends through the outer wall of the passage 17 of the spoke so that this outer end is beneath the outer rim and access may be readily gained thereto.

In the operation of assembling the parts, the inner rim is first placed in position, and the screw bolt 28 is turned to raise the member 24 substantially to the position shown in Fig. 1. This causes the member 24 to act as a clamp for holding the inner rim in position. The outer rim is then put in place and the clamping member 22 is applied so as to force the outer rim against the end of the member 24, and at the same time to force the member 24 against the inner rim to the extent of any lost motion that may be provided for the member 24. The spacing member 24 as well as the clamping bolt 28, are permanently attached so that in removing the rims, the members 24 are lowered to a position beneath the projections of the rims, but are not removed from the wheel so that there is no liability of loss or misplacing of these parts. The clamping member 22 preferably has side walls which straddle the end of the spoke so as to give added strength, give adequate supporting surface and be properly guided, and its outer surface, as well as that of the member 24, may be curved to conform to the rim.

In the construction shown in Fig. 4, I have provided another form of guiding means for the spacing member which is shown in inner or released position. This member 24a is held in place and guided by a pair of pins 30, and these project through diagonally disposed slots. The pins are shown as extending through slots in the sides of the member 24a, and through holes in the side walls of the chamber in the end of the spoke. The ends of the pins may be riveted over and countersunk. The slots may be in the walls of the chamber and the holes in the sides of the member 24a, if desired. Other means might be provided for insuring the proper guiding and limiting of the movement of the spacing member.

Figure 6:
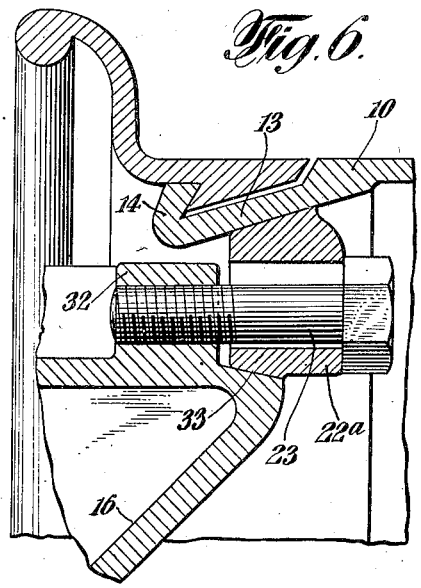
Fig. 6 is a sectional detail showing another means for securing the outer rim.
Figure 7:
Fig. 7 is a front view of the spoke end and clamp shown in Fig. 6.

In Fig. 6 I have illustrated another form of clamping means for the outer rim. Here the cap screw 23 is threaded into an end wall 32 of the chamber which receives the member 24 or 24a. Outside of this wall is a socket or recess 33 in which is mounted the clamping member 22a. This is inclined both on the lower surface and on the upper surface so that it has a radial as well as an axial movement when being forced into position, and thus the range of movement may be correspondingly less. Furthermore, the screw comes between the two inclined surfaces and the pressure on the two is equalized.

Having thus described my invention, what I claim as new and desire to secure by Letters Patent is:

1. A vehicle wheel including a pair of spaced rims each having a projection extending in a radially inward direction and presenting a shoulder facing toward one edge of the rim and an inclined wall facing toward the opposite edge of the rim, the rims being so positioned that the shoulders face toward each other, and a plurality of separate spokes each presenting a pair of oppositely inclined converging faces relatively movable toward and from each other in an axial direction and adapted to engage the inclined faces of said rim projections, a spacing member adapted to engage with and between said rim shoulders, and means projecting through the spoke in a direction having an axially inward component for moving the spacing member into and out of operative position.

2. A vehicle wheel including a pair of spaced rims each having a projection extending in a radially inward direction and presenting a shoulder facing toward one edge of the rim and an inclined wall facing toward the opposite edge of the rim, the rims being so positioned that the shoulders face toward each other, and a plurality of separate spokes unconnected at their outer ends and each presenting a pair of oppositely inclined converging faces, relatively movable toward and from each other in an axial direction and adapted to engage the inclined faces of said rim projections, a spacing member adapted to engage with and between said rim shoulders, and a member projecting beneath one rim in a direction having radial and axial components for moving said spacing member bodily in a direction having a radial component into or out of axial registry with said projections.

3. A vehicle wheel including a pair of spaced rims each having a projection extending in a radially inward direction and presenting a shoulder facing toward one edge of the rim and an inclined wall facing toward the opposite edge of the rim, the rims being so positioned that the shoulders face toward each other, a rim support presenting a pair of oppositely inclined converging faces relatively movable toward and from each other in an axial direction and adapted to engage the inclined faces of said rim projections, and a spacing member adapted to engage with and between said rim shoulders, and movable in a direction at an angle to the axis of the wheel.

4. A vehicle wheel including a pair of spaced rims each having a projection presenting a shoulder facing toward one edge of the rim and an inclined wall facing toward the opposite edge of the rim and in a direction having axial and radial components, the rims being so positioned that the shoulders face toward each other, a rim support presenting a pair of oppositely inclined converging faces relatively movable toward and from each other in an axial direction and adapted to engage the inclined faces of said rim projections, a spacing member adapted to engage with and between said rim shoulders and movable in a direction at an angle to the axis of the wheel, and an adjusting bolt connected to said member and extending beneath one of said rims and in a direction parallel to the direction of movement of said member.

5. A vehicle wheel including a pair of spaced rims each having a projection on the radially inward surface thereof, a rim support having a pair of projections relatively movable toward and from each other in an axial direction, and a spacing member adapted to engage with and between said rim projections and movable into or out of axial registry with said projections in a direction at an acute angle to the axis of the wheel.

6. A vehicle wheel having a plurality of radially extending spokes spaced apart and free from each other at their outer ends, each spoke having at its outer end a pair of projections relatively movable in an axial direction, a pair of rims having projections for engagement between the projections of the several spoke ends, and a spacing member carried by each spoke end and movable outward radially and axially between the rim projections to space them at a predetermined distance apart.

7. A vehicle wheel including a pair of spaced rims each having a projection on the radially inward side thereof and presenting a shoulder facing toward one edge of the rim and an inclined wall facing radially inward and axially toward the opposite edge of the rim, the rims being so positioned that the shoulders face toward each other, and a plurality of separate spokes each presenting an inclined surface for engaging the inclined wall of the inboard rim, a slidable member having an inclined surface for engaging the inclined surface of the outboard rim, a spacing member having abutting engagement between the shoulders of said rims to space them a predetermined distance apart, means for moving said spacing member outward radially to a position between said shoulders and axially against the shoulder of the first mentioned rim, and means for forcing said slidable member in axial direction.

8. A vehicle wheel having an inclined surface serving as a support for one rim, an axially slidable member serving as a support for a second rim, a rim spacing member having surfaces for abutting engagement with said rims, and means for moving said spacing member in a direction at an angle to the axis of the wheel and into or out of operative position.

Signed at New York, in the county of New York and State of New York, this 20th day of October, A. D. 1926.

CHARLES G. KELLER.